UNITED STATES PATENT OFFICE.

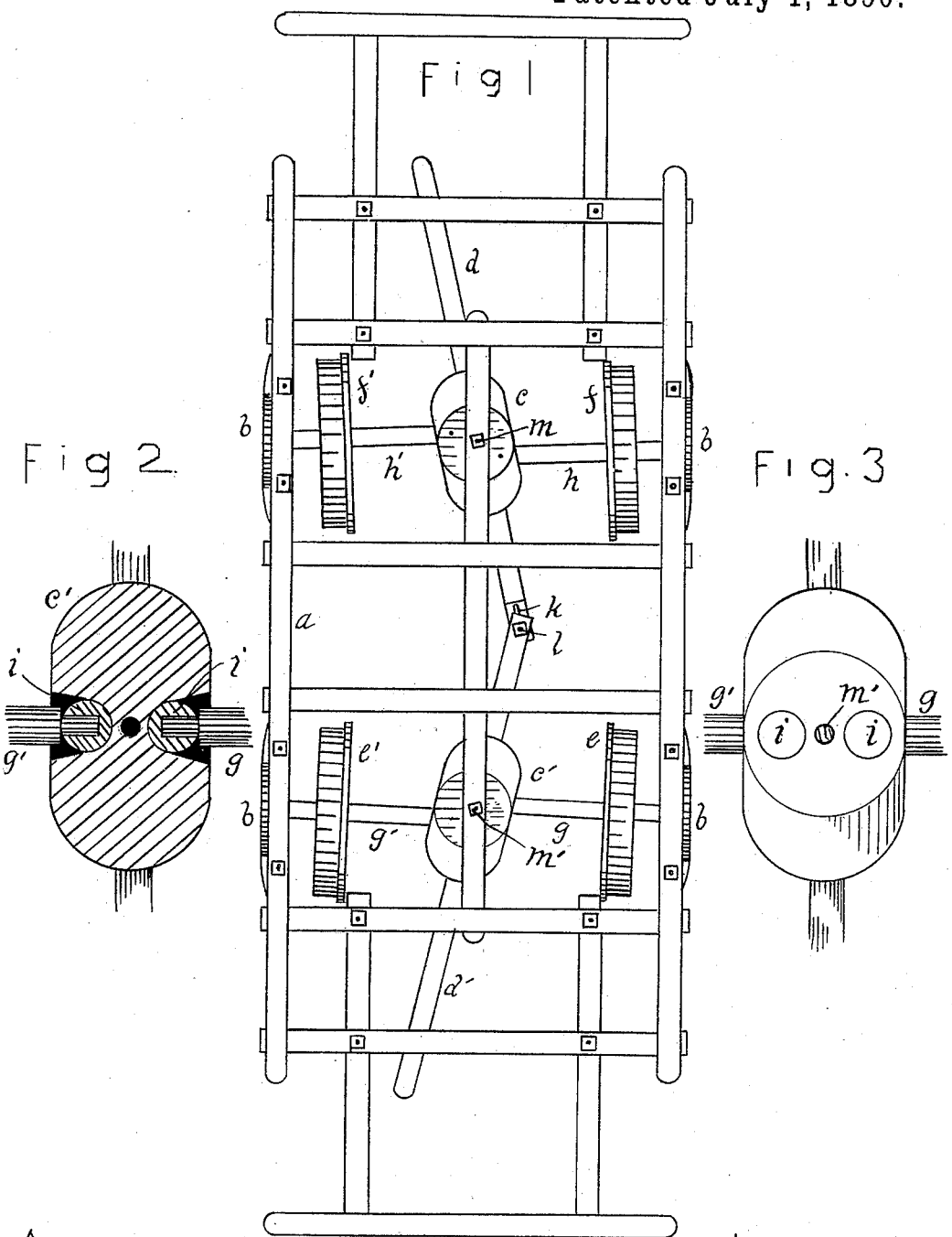

PHILIP A. WILLIAMS, OF DECATUR, ILLINOIS.

CAR-TRUCK.

SPECIFICATION forming part of Letters Patent No. 431,133, dated July 1, 1890.

Application filed January 30, 1890. Serial No. 338,647. (No model.)

*To all whom it may concern:*

Be it known that I, PHILIP A. WILLIAMS, of Decatur, in the county of Macon and State of Illinois, have invented a certain new and useful Improvement in Car-Trucks, of which the following is a specification.

My invention relates more particularly to trucks for cars used on street-railways.

My object is to enable the cars to run easily around curves and make switches accurately. I attain my object by means of the details of construction and combinations of parts, hereinafter set forth and claimed.

In the drawings accompanying and forming a part of this specification, Figure 1 is a plan of a truck embodying my invention. Fig. 2 is a plan of the lower surface of a pivot-block, and Fig. 3 is a horizontal section of such block at the vertical center thereof.

The frame $a$ may be of any suitable construction, and it is provided with axle-bearings $b\ b\ b\ b$. Midway between wheels $f\ f'$ is block $c$, pivoted on bolt $m$ and having independent pivotal bearings for axles $h$ and $h'$. A bar $d$ is suitably secured to the block, and it extends in both directions, forward and backward. A similar block $c'$ pivots on bolt $m'$ midway between wheels $e$ and $e'$, and it provides independent pivotal bearings for axles $g$ and $g'$. Bar $d'$ is connected with block $c'$, and it extends to the end of the truck and connects at the center of the truck with bar $d$. The bar $d$ has the slot $k$ and the bar $d'$ has the bolt that extends through the slot of bar $d$ and forms a sliding connection between the two bars. The bearings for the axles are shown at $i$ in Figs. 2 and 3, and they are the same in both blocks and in the sides of the truck.

Suitable connections are to be made with bars $d$ and $d'$ at both ends of the truck, and the operation of the device consists simply in swinging said bars to one side or the other, as shown in Fig. 1, in which figure the car is assumed to be going toward the top of the paper and curving toward the left. It will be seen that the position of the wheels is such that the car would make the turn without the guidance of the rails, thereby obviating friction, and the same adjustment would compel the car to make a switch to the left. A contrary adjustment of the bars will turn the car in an opposite direction, as will be readily apparent.

I claim as new and desire to secure by Letters Patent—

The car-truck comprising the central pivotal blocks having the pivotal bearings, the axles journaled in the blocks and in the sides of the truck, and the bars $d\ d'$, secured to the blocks and connected together, as set forth.

In testimony whereof I sign my name in the presence of two subscribing witnesses.

P. A. WILLIAMS.

Attest:
W. W. GRAHAM,
I. D. WALKER.